United States Patent
Hsu et al.

(10) Patent No.: US 9,813,730 B2
(45) Date of Patent: Nov. 7, 2017

(54) METHOD AND APPARATUS FOR FINE-GRAINED MOTION BOUNDARY PROCESSING

(71) Applicant: MEDIATEK INC., Hsin-Chu (TW)

(72) Inventors: Chih-Wei Hsu, Taipei (TW);
Ching-Yeh Chen, Taipei (TW)

(73) Assignee: MEDIATEK INC., Hsinchu (TW)

( * ) Notice: Subject to any disclaimer, the term of this patent is extended or adjusted under 35 U.S.C. 154(b) by 182 days.

(21) Appl. No.: 14/555,901

(22) Filed: Nov. 28, 2014

(65) Prior Publication Data

US 2015/0163509 A1    Jun. 11, 2015

Related U.S. Application Data (60) Provisional application No. 61/912,690, filed on Dec. 6, 2013.

(51) Int. Cl.
| | |
|---|---|
| H04N 19/513 | (2014.01) |
| H04N 19/52 | (2014.01) |
| H04N 19/583 | (2014.01) |
| H04N 19/567 | (2014.01) |

(52) U.S. Cl.
CPC ......... H04N 19/583 (2014.11); H04N 19/567 (2014.11)

(58) Field of Classification Search
None
See application file for complete search history.

(56) References Cited

U.S. PATENT DOCUMENTS

| | | | | |
|---|---|---|---|---|
| 7,162,093 | B2* | 1/2007 | Regunathan | H04N 19/105 375/240.25 |
| 8,369,405 | B2* | 2/2013 | Shi | H04N 19/577 375/240 |
| 8,711,940 | B2* | 4/2014 | Lin | H04N 19/52 375/240.16 |
| 8,849,054 | B2* | 9/2014 | Liu | H04N 5/145 348/208.4 |
| 8,897,585 | B2* | 11/2014 | Samuelsson | 375/240.05 |

(Continued)

OTHER PUBLICATIONS

Chen, et al, "Overlapped block motion compensation in TMuC", in Joint Collaborative Team on Video Coding (JCT-VC), of ITU-T SG16 WP3 and ISO/IEC JTC1/SC29/WG11 3rd Meeting: Guangzhou, CN, Oct. 7-15, 2010, Document: JCTVC-C251.

(Continued)

Primary Examiner — Mohammad J Rahman
(74) Attorney, Agent, or Firm — McClure, Qualey & Rodack, LLP

(57) ABSTRACT

A method and apparatus for deriving fine-grained motion compensated prediction of boundary pixels in a video coding system are disclosed. Embodiments of the present invention determine one or more neighboring coding units (CUs) adjacent to a current coding unit (CU). For each neighboring CU, motion-compensated prediction is derived for each neighboring CU using the MV of the neighboring CU. The pre-generated predictors at a bottom side or a right side of each neighboring CUs are derived and stored on a smallest CU (SCU) basis. The pre-generated predictors and the motion compensated predictor for a current boundary pixel are combined using weighting factors to form a final predictor for the current pixel.

18 Claims, 7 Drawing Sheets

(56) References Cited

U.S. PATENT DOCUMENTS

| | | | |
|---|---|---|---|
| 8,948,257 B2* | 2/2015 | Komatsu | H04N 19/159 375/240.12 |
| 9,053,550 B2* | 6/2015 | Li | G06T 7/0075 |
| 9,137,544 B2* | 9/2015 | Lin | H04N 19/52 |
| 9,258,519 B2* | 2/2016 | Shi | H04N 7/0137 |
| 9,300,963 B2* | 3/2016 | Lin | H04N 19/52 |
| 9,699,456 B2* | 7/2017 | Chien | H04N 19/51 |
| 2005/0265451 A1* | 12/2005 | Shi | H04N 19/577 375/240.15 |
| 2007/0071100 A1* | 3/2007 | Shi | H04N 7/0137 375/240.16 |
| 2008/0310510 A1* | 12/2008 | Hiwasa | H04N 9/8042 375/240.16 |
| 2010/0215101 A1* | 8/2010 | Jeon | H04N 19/105 375/240.12 |
| 2010/0296582 A1* | 11/2010 | Shimizu | H04N 19/56 375/240.16 |
| 2011/0274162 A1* | 11/2011 | Zhou | H04N 19/176 375/240.03 |
| 2012/0106622 A1* | 5/2012 | Huang | H04N 19/129 375/240.01 |
| 2012/0106652 A1* | 5/2012 | Huang | H04N 19/70 375/240.25 |
| 2012/0162451 A1* | 6/2012 | Liu | H04N 5/145 348/208.4 |
| 2012/0177120 A1* | 7/2012 | Guo | H04N 19/159 375/240.16 |
| 2012/0213449 A1* | 8/2012 | Samuelsson | H04N 19/182 382/238 |
| 2013/0022115 A1* | 1/2013 | Oh | H04N 19/122 375/240.12 |
| 2013/0022119 A1* | 1/2013 | Chien | H04N 19/159 375/240.16 |
| 2013/0128974 A1* | 5/2013 | Chien | H04N 19/00903 375/240.15 |
| 2013/0129237 A1* | 5/2013 | Yie | G06T 9/004 382/233 |
| 2013/0188884 A1* | 7/2013 | Kim | H04N 19/176 382/233 |
| 2013/0329784 A1* | 12/2013 | Chuang | H04N 19/102 375/240.02 |
| 2014/0003528 A1* | 1/2014 | Tourapis | H04N 19/00424 375/240.16 |
| 2014/0133568 A1* | 5/2014 | Otsuka | H04N 19/436 375/240.16 |
| 2016/0295215 A1* | 10/2016 | Hsu | H04N 19/105 |

OTHER PUBLICATIONS

Guo, et al, "CE2: Overlapped Block Motion Compensation for 2NxN and Nx2N Motion Partitions", in Joint Collaborative Team on Video Coding (JCT-VC), of ITU-T SG16 WP3 and ISO/IEC JTC1/SC29/WG11, 6th Meeting: Torino, Jul. 14-22, 2011, Document: JCTVC-F299.

* cited by examiner

METHOD AND APPARATUS FOR FINE-GRAINED MOTION BOUNDARY PROCESSING

CROSS REFERENCE TO RELATED APPLICATIONS

The present invention is a non-provisional application of and claims priority to U.S. Provisional Patent Application, Ser. No. 61/912,690, filed Dec. 6, 2013, entitled "Implementation of Fine-grained Motion Boundary Enhancement". The U.S. Provisional Patent Application is hereby incorporated by reference in its entirety.

FIELD OF THE INVENTION

The present invention relates to video coding. In particular, the present invention relates to method and apparatus for motion boundary processing to reduce discontinuity at coding unit boundaries.

BACKGROUND

Motion estimation is an effective inter-frame coding technique to exploit temporal redundancy in video sequences. Motion-compensated inter-frame coding has been widely used in various international video coding standards The motion estimation adopted in various coding standards is often a block-based technique, where motion information such as coding mode and motion vector is determined for each macroblock or similar block configuration. In addition, intra-coding is also adaptively applied, where the picture is processed without reference to any other picture. The inter-predicted or intra-predicted residues are usually further processed by transformation, quantization, and entropy coding to generate compressed video bitstream. During the encoding process, coding artifacts are introduced, particularly in the quantization process. In order to alleviate the coding artifacts, additional processing has been applied to reconstructed video to enhance picture quality in newer coding systems. The additional processing is often configured in an in-loop operation so that the encoder and decoder may derive the same reference pictures to achieve improved system performance.

Figure 1A:
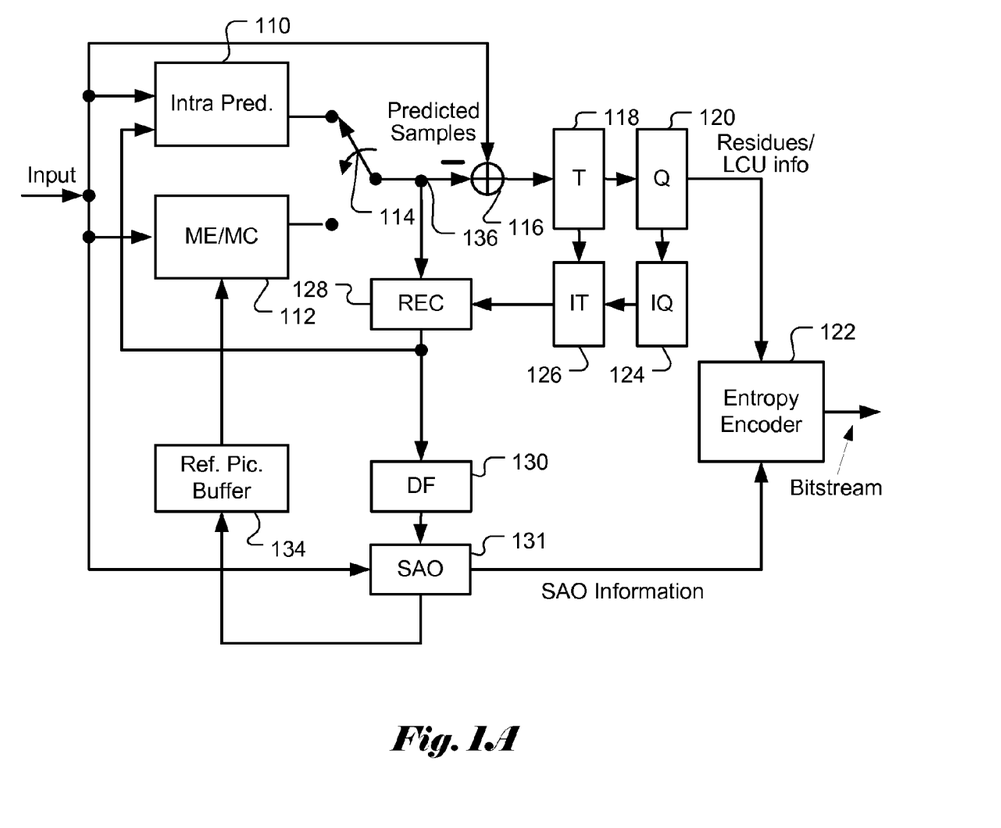
FIG. 1A illustrates an exemplary adaptive inter/intra video encoder associated with an HEVC coding system.

FIG. 1A illustrates an exemplary system block diagram for an video encoder based on High Efficiency Vide Coding (HEVC) using adaptive Inter/Intra prediction. For Inter-prediction, Motion Estimation (ME)/Motion Compensation (MC) 112 is used to provide prediction data based on video data from other picture or pictures. Switch 114 selects Intra Prediction 110 or Inter-prediction data and the selected prediction data is supplied to Adder 116 to form prediction errors, also called residues. The prediction error is then processed by Transformation (T) 118 followed by Quantization (Q) 120. The transformed and quantized residues are then coded by Entropy Encoder 122 to form a video bitstream corresponding to the compressed video data. The bitstream associated with the transform coefficients is then packed with side information such as motion, mode, and other information associated with the image area. The side information may also be subject to entropy coding to reduce required bandwidth. Accordingly, the data associated with the side information are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, various in-loop processing is applied to the reconstructed video data before the reconstructed video data are stored in the Reference Picture Buffer 134 in order to improve video quality. In the High Efficiency Video Coding (HEVC) standard being developed, Deblocking Filter (DF) 130 and Sample Adaptive Offset (SAO) 131 have been developed to enhance picture quality. The in-loop filter information may have to be incorporated in the bitstream so that a decoder can properly recover the required information. Therefore, in-loop filter information from SAO is provided to Entropy Encoder 122 for incorporation into the bitstream. In FIG. 1A, DF 130 is applied to the reconstructed video first; SAO 131 is then applied to DF-processed video. However, the processing order among DF and SAO can be re-arranged.

Figure 1B:
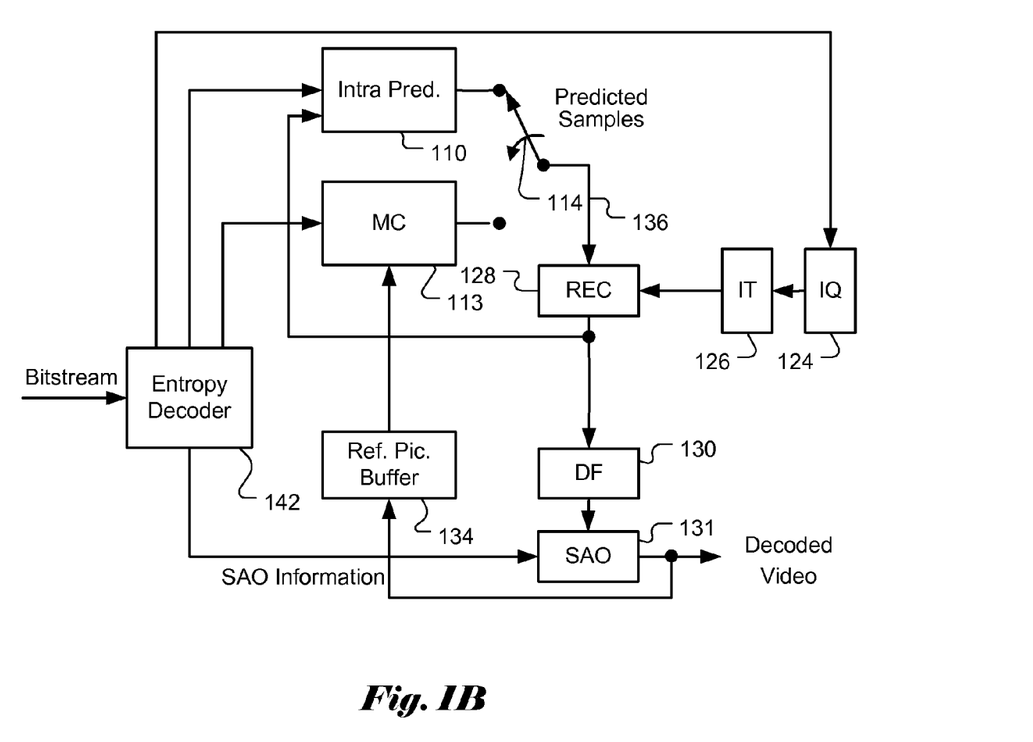
FIG. 1B illustrates an exemplary adaptive inter/intra video decoder associated with an HEVC coding system.

A corresponding decoder for the encoder of FIG. 1A is shown in FIG. 1B. The video bitstream is decoded by Video Decoder 142 to recover the transformed and quantized residues, SAO information and other system information. At the decoder side, only Motion Compensation (MC) 113 is performed instead of ME/MC. The decoding process is similar to the reconstruction loop at the encoder side. The recovered transformed and quantized residues, SAO information and other system information are used to reconstruct the video data. The reconstructed video is further processed by DF 130 and SAO 131 to produce the final enhanced decoded video.

In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU, also referred as CTU, coded tree unit in HEVC). In addition to the concept of coding unit, the concept of prediction unit (PU) is also introduced in HEVC. Once the splitting of CU hierarchical tree is done, each leaf CU is further split into prediction units (PUs) according to prediction type and PU partition. The Inter/Intra prediction process in HEVC is applied to the PU basis. For each 2N×2N leaf CU, a partition size is selected to partition the CU. A 2N×2N PU may be partitioned into 2N×2N, 2N×N, or N×2N PU when Inter mode is selected. When a 2N×2N PU is Intra coded, the PU may be partitioned into either one 2N×2N or four N×N.

While non-overlapped motion prediction blocks are most used in HEVC practice, there are also proposals for overlapped motion compensation presented during HEVC standard development. Overlapped Block Motion Compensation (OBMC) is a technical proposed during the HEVC standard development. OBMC utilizes Linear Minimum Mean Squared Error (LMMSE) technique to estimate a pixel intensity value based on motion-compensated signals derived from neighboring block motion vectors (MVs). From estimation-theoretic perspective, these MVs are regarded as different plausible hypotheses for its true motion, and to maximize coding efficiency, their weights should minimize the mean squared prediction error subject to the unit-gain constraint.

Figure 2:
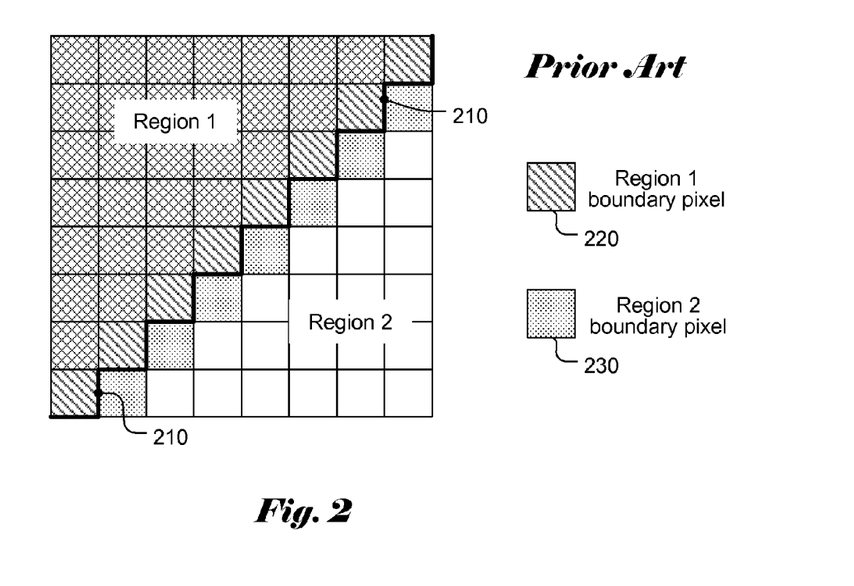
FIG. 2 illustrates an example of Overlapped Block Motion Compensation (OBMC) for geometry partitions.

An OBMC proposal during HEVC development is disclosed in JCTVC-C251 (Chen, et al, "*Overlapped block* motion compensation in TMuC", in Joint Collaborative Team on Video Coding (JCT-VC), of ITU-T SG16 WP3 and ISO/IEC JTC1/SC29/WG11 3rd Meeting: Guangzhou, CN, 7-15 Oct. 2010, Document: JCTVC-C251), where OBMC is applied to geometry partition. In geometry partition, it is very likely that a transform block contains pixels belonging to different partitions since two different motion vectors are used for motion compensation. Therefore, the pixels at the partition boundary may have large discontinuities that can produce visual artifacts similar to blockiness. This in turn decreases the coding efficiency since the signal energy in the transform domain will spread wider toward high frequencies. Let the two regions created by a geometry partition be denoted as region 1 and region 2. The zig-zag line segments (210) indicate the partition line for region 1 and region 2. A pixel from region 1 (2) is defined to be a boundary pixel if any of its four connected neighbors (left, top, right, and bottom) belongs to region 2 (1). FIG. 2 illustrates an example, where pixels corresponding to the boundary of region 1 are indicated by pattern 1 and pixels corresponding to the boundary of region 2 are indicated by pattern 2. If a pixel is a boundary pixel (indicated by pattern 1 or 2), the motion compensation is performed using a weighted sum of the motion predictions from the two motion vectors. The weights are ¾ for the prediction using the motion vector of the region containing the boundary pixel and ¼ for the prediction using the motion vector of the other region. In other words, the pixel at the boundary is derived from the weighted sum of two predictors corresponding to two different motion vectors. The overlapping boundaries improve the visual quality of the reconstructed video while providing BD-rate gain.

Another OBMC proposal during the HEVC standard development is disclosed in JCTVC-F299 (Guo, et al, "CE2: Overlapped Block Motion Compensation for 2N×N and N×2N Motion Partitions", in Joint Collaborative Team on Video Coding (JCT-VC), of ITU-T SG16 WP3 and ISO/IEC JTC1/SC29/WG11, 6th Meeting: Torino, 14-22 Jul. 2011, Document: JCTVC-F299), where OBMC is applied to symmetrical motion partitions. If a coding unit (CU) is partitioned into two 2N×N or N×2N partition units (PUs), OBMC is applied to the horizontal boundary of the two 2N×N prediction blocks, and the vertical boundary of the two N×2N prediction blocks. Since those partitions may have different motion vectors, the pixels at partition boundary (i.e., PU boundaries) may have large discontinuities, which may generate visual artifacts and also reduce the coding efficiency. In JCTVC-F299, OBMC is introduced to smooth the boundaries of motion partition.

Figure 3A:
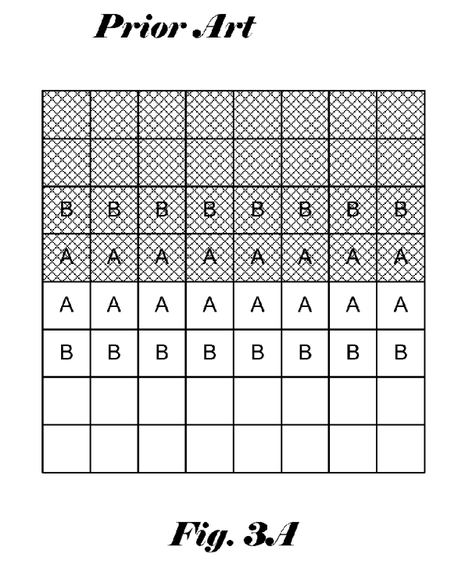
FIG. 3A illustrates exemplary Overlapped Block Motion Compensation (OBMC) for 2N×N prediction units (PUs).
Figure 3B:
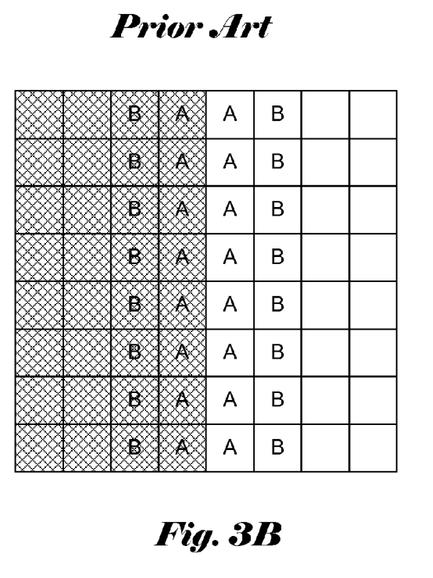
FIG. 3B illustrates exemplary Overlapped Block Motion Compensation (OBMC) for N×2N prediction units (PUs).

FIG. 3 illustrates exemplary OBMC for 2N×N (FIG. 3A) and N×2N blocks (FIG. 3B). The pixels in the shaded area belong to Partition 0 and the pixels in the clear area belong to Partition 1. The overlapped region in the luma component is defined as 2 rows (or columns) of pixels on each side of the horizontal (or vertical) PU boundary. For pixels that are 1 row (or column) apart from the partition boundary, i.e., pixels labeled as A in FIG. 3, OBMC weighting factors are (¾, ¼). For pixels that are 2 rows (columns) away from the partition boundary, i.e., pixels labeled as B in FIG. 3, OBMC weighting factors are (⅞, ⅛). For chroma components, the overlapped region is defined as 1 row (or column) of pixels on each side of the horizontal (or vertical) PU boundary, and the weighting factors are (¾, ¼).

BRIEF SUMMARY OF THE INVENTION

A method and apparatus for deriving fine-grained motion compensated prediction for boundary pixels in a video coding system are disclosed. Embodiments of the present invention determine one or more neighboring coding units (CUs) associated with a current coding unit (CU), where each of said one or more neighboring CUs is associated with a neighboring motion vector (MV). For each neighboring CU, motion-compensated prediction using the neighboring MV are performed for each of said one or more neighboring CUs to derive pre-generated predictors at a bottom side or a right side of each of said one or more neighboring CUs on a smallest CU (SCU) basis. The pre-generated predictors correspond to one or more boundary lines or columns in a boundary region of the current CU. The pre-generated predictors associated with said one or more neighboring CUs are stored and used later for fine-grained motion of boundary pixels of the current CU. A first predictor for a current boundary pixel in the boundary region of the current CU will be generated using the motion vector of the current CU. The pre-generated predictor for a current boundary pixel of the current CU is combined with one or more pre-generated predictors using weighting factors to form a weighted predictor for the current boundary pixel. The current CU is then coded using prediction data including the current boundary pixel predictor.

The size of the boundary lines or columns in the boundary region of the current CU can be pre-defined or adaptively determined based on CU size or PU size. When the current CU comprises a luma component and at least one chroma component, the current boundary pixel predictor for the current boundary pixel also comprises the luma component and said at least one chroma component. A local line buffer can be used to store the pre-generated predictors corresponding to said one or more boundary lines or columns in the boundary region of the current CU. The size of the local line buffer can be pre-defined. The size of the local line buffer can also be proportional to frame width.

DETAILED DESCRIPTION OF THE INVENTION

Figure 4A:
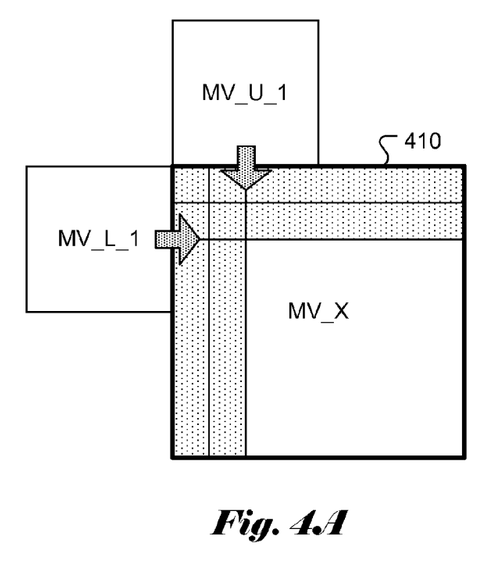
FIG. 4A illustrates an example of Motion Boundary Enhancement (MBE) according to an embodiment of the present invention, where an above motion vector and a left motion vector are used with the current motion vector to form weighted prediction for boundary pixels.

In HEVC, each coding unit (CU) may be partitioned into one or more prediction units (Pus). The OBMC is only applied to PU boundaries as described in the previous section. However, motion discontinuity may also exist at the CU boundaries as well. Accordingly, the present invention discloses a boundary pixel processing technique named motion boundary enhancement (MBE) to improve the motion compensated prediction at the CU boundaries. FIG. 4 illustrates an example according to an embodiment of the present invention. In FIG. 4A, the current CU boundaries are indicated by thick lines (410). The pixels at the CU boundaries will use the motion vector(s) from the upper side (MV_U), the left side (MV_L) or both the upper side and the left side in addition to its own motion vector (MV_X) to form a weighted sum of motion prediction when performing motion compensation. Note that MV_U_1 is the first available motion vector derived from the upper CUs and MV_L_1 is the first available motion vector derived from the left CUs. It is well known in HEVC that a CU may be partitioned into multiple PUs and each PU may have its own motion vector. Therefore, the motion vector (i.e., MV_X) for a pixel in the CU boundary depends on which PU that the pixel is located.

Figure 4B:
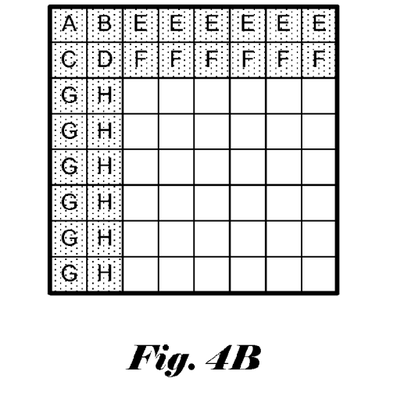
FIG. 4B illustrates an example of weighting factors for Motion Boundary Enhancement (MBE) according to an embodiment of the present invention.

FIG. 4B illustrates an example of MBE in details according to an embodiment of the present invention. Pixels A through D in FIG. 4B correspond to the overlapped vertical and horizontal boundaries. Both motion vectors MV_U_1 and MV_L_1 will be used for these pixels in addition to MV_X. The weighting factors are (2/8, 2/8, 4/8) for MV_U_1, MV_L_1 and MV_X, respectively for pixel A. In other words, pixel A according to MBE is calculated as a weighted sum of three predictors associated with three motion vectors (i.e., MV_U_1, MV_L_1 and MV_X). Each predictor is derived using motion compensation based on the respective motion vector. After the three predictors are derived, pixel A is generated based on the three predictors using the weighting factor (2/8, 2/8, 4/8). For pixel B, the corresponding weighting factors are (2/8, 1/8, 5/8). For pixel C, the corresponding weighting factors are (1/8, 2/8, 5/8). For pixel D, the corresponding weighting factors are (1/8, 1/8, 6/8). For pixels labeled as E and F, only MV_U_1 will be used with MV_X. The weighting factors are (2/8, 6/8) for MV_U_1 and MV_X for pixel E. For pixel F, the weighting factors are (1/8, 7/8). For pixels labeled as G and H, only MV_L_1 will be used with MV_X. The weighting factors are (2/8, 6/8) for MV_L_1 and MV_X for pixel G. For pixel H, the weighting factors are (1/8, 7/8).

The weighting factors disclosed above are intended to illustrate examples of MBE. These exemplary weighting factors shall not be construed as limitations to the present invention. A person skilled in the art may use other weighting factors to practice the present invention. The weighting factors can be pre-defined or adaptively determined based on a distance between the current boundary pixel and a left or above CU boundary. For example, a larger weighting factor may be used for a boundary pixel at a shorter distance from the CU boundary. While the example in FIG. 4 includes two pixel lines and two pixel columns in the boundary region, different number of pixel lines/columns may also be used to practice the present invention. The size of the boundary region can be pre-defined or adaptively determined based on CU size or PU size. For example, more pixel lines or columns may be used for larger CU or PU sizes.

The MBE processing can be always enabled and applied for video data being coded. However, the MBE process may also be turned On/Off explicitly. For example, a flag may be used to indicate whether MBE process is On or Off for the underlying video data. The underlying data may correspond to a CU, a CTU (coding tree unit), a CTB (coding tree block), a slice, a picture or a sequence. The MBE may also be applied to difference color components of the video data. Different MBE process may be applied to different color components. For example, the MBE process may be applied to the luma component, but not the chroma component. Alternatively, MBE process may applied to both luma and chroma component. However, the weighting factors are different for different color components. Furthermore, different boundary regions may be selected for different color components. For example, less pixel lines/columns can be used for the chroma components.

MBE can be applied independently from OBMC. It may also be applied before or after the OBMC process so that not only PU boundaries but also CU boundaries can be improved with multiple motion vectors. Furthermore, it may also be applied jointly with the OBMC process to share data accessed during processing. Therefore, the joint processing may reduce memory access bandwidth or reduce buffer requirement.

Figure 5:
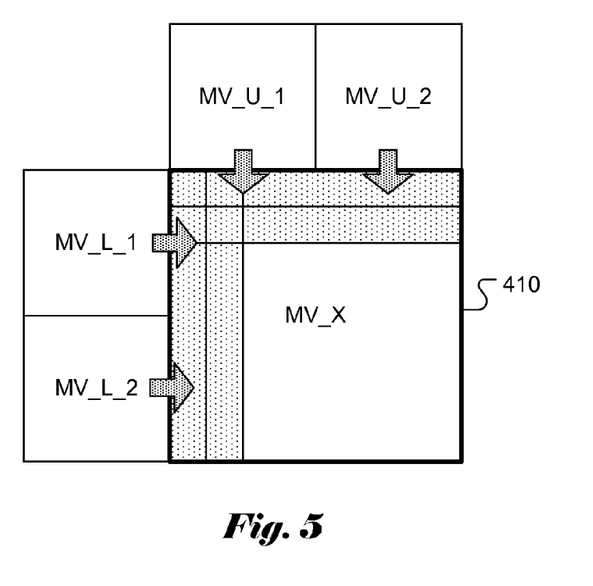
FIG. 5 illustrates an example of fine-grained Motion Boundary Enhancement (fg-MBE) according to an embodiment of the present invention, where the above motion vector and the left motion vector are determined based on smallest coding unit (SCU).

To further improve the coding performance, fine-grained MBE (fg-MBE) can be used. FIG. 5 illustrates an example of fine-grained MBE. In FIG. 5, for the current CU 410 with size 8×8, the neighboring motion vectors from the left side and the upper side are derived based on 4×4 smallest coding unit (SCU). As is known in HEVC, a CU may be partitioned into smaller CUs using quadtree. The partition process is stopped when the CU reaches the smallest size, i.e., smallest CU (SCU). The SCU according to HEVC is 4×4. While the current CU size of 8×8 is illustrated in the example of FIG. 5, the current CU may correspond to other sizes (e.e., 16×16 or 32×32). Since the motion vectors for each SCU may belong to different PUs or even different CUs, the motion vectors may be different from each other. For example, MV_L_1 and MV_L_2 in FIG. 5 may be different. Also, MV_U_1 and MV_U_2 may be different. The motion information derived accordingly will be more accurate to generate more accurate motion compensated predictors. In some cases, the motion vector may not available for an SCU. For example, the SCU is Intra coded or the SCU is a boundary block with an invalid MV. In this case, a motion compensated predictor can be generated by data padding or using weighted sum from the existing predictors.

Figure 6:
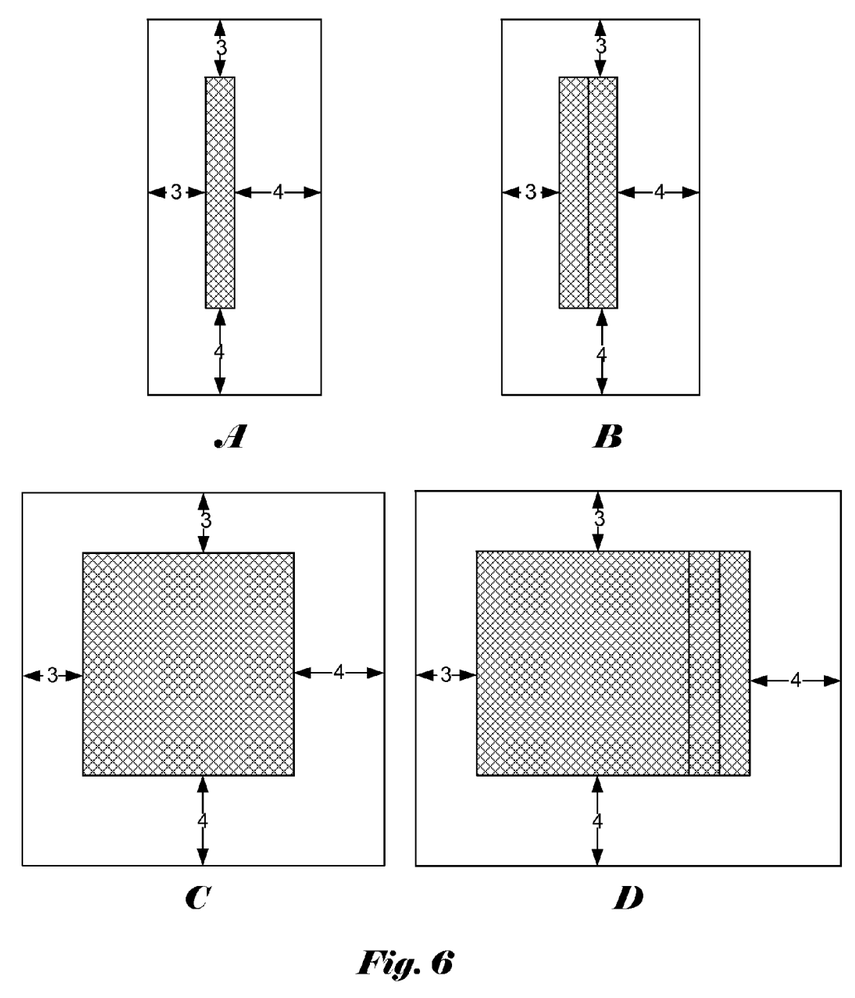
FIG. 6 illustrates various examples of data window required to perform motion-compensated prediction using fractional motion vectors for (A) a 1×8 pixel line, (B) two 1×8 pixels lines, (C) an 8×8 CU, and (D) an 8×8 CU with two additional boundary pixel lines on the right side.

The disclosed MBE technique performs motion compensation operations using motion vectors either from left or upper CUs to generate the predictors for the boundary pixels. Depending on the number of pixel lines used for MBE, extra memory bandwidth is needed for performing MC operations. FIG. 6 shows the pixels needed to be fetched from frame memory if fractional motion compensation with 8 tap filter is used for different number of pixel lines. In FIG. 6A, one 1×8 pixel line at the CU boundary is being processed according to fg-MBE. Additional pixels around the 1×8 pixel line are required to support interpolation associated with fractional motion vector. For the 8-tap interpolation filter, reference pixels within the 8×15 window are needed for the 1×8 pixel line. However, the window size is dependent on the size of boundary pixels to be processed as well as the interpolation filter used for fractional-pixel motion vector. In FIG. 6B, 9×15 pixels are needed for two 1×8 pixel lines. The number of pixels to fetch for two lines is not doubled compared to the one pixel line case since most of the fetched pixels can be shared between two adjacent lines. Therefore, if motion compensation can be performed for as many lines as possible at the same time, the pixels fetched can be shared for more efficient memory usage to reduce memory bandwidth requirement. FIG. 6C illustrates the data required to perform motion compensation for a size 8×8 CU, which may correspond to the left CU at the CU boundary. As shown in FIG. 6C, it requires fetching 15×15 pixels. The MBE process for two 1×8 pixel lines of the current CU will require 9×15 pixels as shown in FIG. 6B. If these two operations are performed jointly, the pixels can be fetched and shared. This will result in a total of 17×15 pixels as shown in FIG. 6D, which represents 30% less memory bandwidth compared to the case performing left CU motion compensation and MBE of current CU independently.

Different from MBE, fg-MBE uses the exact motion data either from left or upper SCUs to perform motion compensation. The motion data includes reference frame and motion vectors. During the derivation of weighted sum of motion compensated predictors, the motion compensated predictor associated with a neighboring SCU will use the motion information from the neighboring SCU. Therefore, it may be advantageous to combine motion compensation operations for the neighboring SCUs with the motion compensated predictor derivation for the fg-MBE of neighboring boundary pixels. Accordingly, an embodiment of the present invention generates extra lines of motion compensated predictors while performing motion compensation for a neighboring CU. The extra lines of motion compensated predictors will be used by the following adjacent CU or CUs to perform MBE. It can reduce the memory bandwidth as described in the previous section. However, extra lines of motion compensated predictors corresponding to pre-generated predictors for the following CU have to be stored in a buffer. The system cost increase associated with the extra buffer can be justified by the reduced memory bandwidth requirement.

Figure 7:
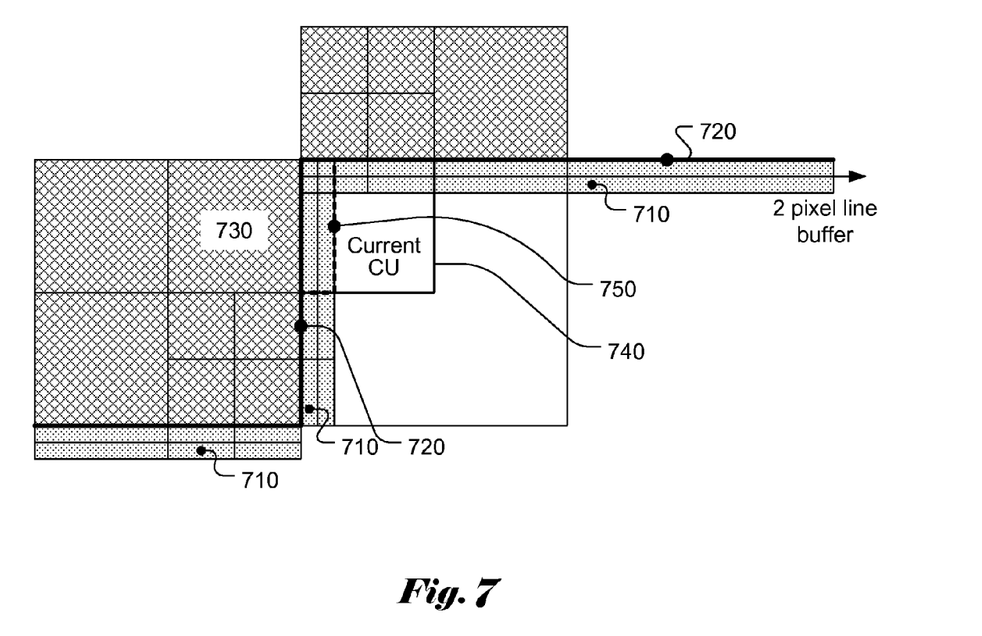
FIG. 7 illustrates an embodiment of the present invention to incorporate a 2 pixel-line buffer to store pre-generated predictors for fine-grained motion block enhancement.

FIG. 7 illustrates an example of fg-MBE having 2 boundary pixel lines/columns in the boundary region used as the pre-generated predictors. These 2 pixel lines/columns (710) located along the CU boundaries (720) are buffered and used by the following CU or CUs as pre-generated predictors. These pre-generated predictors are generated when the motion-compensated prediction is performed for the corresponding neighboring CU. For example, when motion compensation is applied to the neighboring CU (730) at the left side of the current CU (740), the motion compensation process can be extended to include two extra lines (highlighted by thick-lined box 750) corresponding to the two pixel lines at the left boundary of CU 740. The fg-MBE for the two boundary pixel lines (indicated by dash-lined box 750) in the left side of the current CU will require the motion vector from the neighboring block 730 to form a motion-compensated predictor associated with the motion vector of neighboring block 730. The motion-compensated prediction for neighboring block 730 has to access the corresponding motion vector and the reference picture data. To generate the two extra pixels lines corresponding to the pre-generated predictors for fg-MBE of the current CU (740) can be efficiently accomplished by accessing two extra reference pixel lines and processing the two extra lines during motion-compensated processing of the neighboring CU (730). The pre-generated predictors will be used by the corresponding boundary pixels (i.e., co-collated pixels in the boundary region). Accordingly, the technique to generate the pre-generated predictors during motion compensation process of neighboring CU to the left and to the above of the current CU offers great benefit compared to a system without using the pre-generated predictors. With this implementation method, it provides a trade-off between memory bandwidth and local buffer usage.

The number of boundary lines or columns in the boundary region of the current CU can be pre-defined or determined adaptively based on CU size or PU size. The fg-MBE technique disclosed above can be applied to a color video system having a luma component and one or more chroma components. The fg-MBE technique can be applied to color components individually. A local line buffer can be used to store the pre-generated predictors corresponding to the boundary lines or columns in the boundary region of the current CU. The size of the local line buffer can be pre-defined. The size of the local line buffer may also be proportional to frame width.

Figure 8:
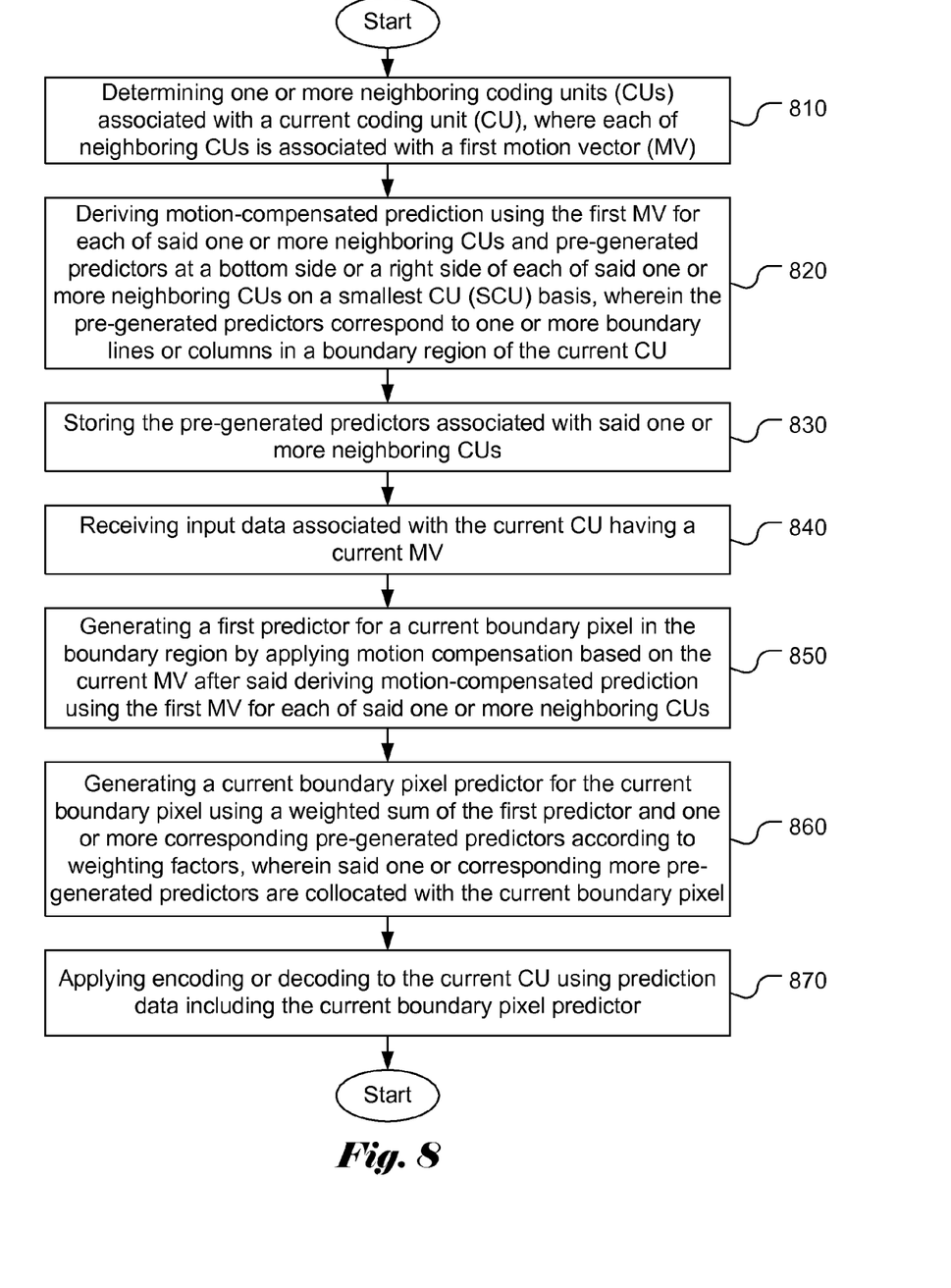
FIG. 8 illustrates an exemplary flow chart for a video coding system incorporating fine-grained Motion Boundary Enhancement with pre-generated predictor according to an embodiment of the present invention.

FIG. 8 illustrates an exemplary flow chart for a video coding system incorporating fine-grained Motion Boundary Enhancement with pre-generated predictor according to an embodiment of the present invention. One or more neighboring coding units (CUs) associated with a current coding unit (CU) are determined in step 810, where each of said one or more neighboring CUs is associated with a neighboring motion vector (MV). Motion-compensated prediction is derived using the neighboring MV for each of said one or more neighboring CUs and pre-generated predictors at a bottom side or a right side of each of said one or more neighboring CUs on a smallest CU (SCU) basis as shown in step 820, where the pre-generated predictors correspond to one or more boundary lines or columns in a boundary region of the current CU. The pre-generated predictors associated with said one or more neighboring CUs are stored for later use by subsequent CUs as shown in step 830. Input data associated with the current CU having a current MV is received in step 840. The input data associated with the current coding unit may be accessed from a media such as a RAM or DRAM in a system. Also the input data associated with the current coding unit may be received directly from a processor (such as a central processing unit, a controller or a digital signal processor). At an encoder side, the input data corresponds to the pixel data to be processed according to motion compensation. At the decoder side, the input data corresponds to motion compensated residue and the decoding process will reconstruct the current CU using motion compensated prediction and motion compensated residue. A first predictor is generated for a current boundary pixel in the boundary region by applying motion compensation based on the current MV after said deriving motion-compensated prediction using the neighboring MV for each of said one or more neighboring CUs as shown in step 850. A current boundary pixel predictor for the current boundary pixel is generated using a weighted sum of the first predictor and one or more corresponding pre-generated predictors according to weighting factors as shown in step 860. The corresponding pre-generated predictors are collocated with the current boundary pixel. Encoding or decoding is then applied to the current CU using the prediction data including the current boundary pixel predictor.

The exemplary flowchart shown in FIG. 8 is for illustration purpose. A skilled person in the art may re-arrange, combine steps or split a step to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of fine-grained motion compensated prediction for boundary pixels in a video coding system, the method comprising:
   determining one or more neighboring coding units (CUs) associated with a current coding unit (CU), wherein each of said one or more neighboring CUs is associated with a neighboring motion vector (MV);
   performing motion-compensated prediction using the neighboring MV for each of said one or more neighboring CUs to derive pre-generated predictors, wherein the pre-generated predictors correspond to one or more boundary lines or columns in a boundary region of the current CU;
   storing the pre-generated predictors;
   receiving input data associated with the current CU having a current MV;
   generating a first predictor for a current boundary pixel in the boundary region by applying motion compensation based on the current MV, wherein pixels at boundaries of the current CU utilize the current MV and at least one MV from at least one of: an upper side MV and a left side MV to form a weighted sum of motion prediction when performing motion compensation;
   generating a current boundary pixel predictor for the current boundary pixel using a weighted sum of the first predictor and one or more corresponding pre-generated predictors according to weighting factors; and
   applying encoding or decoding to the current CU using prediction data including the current boundary pixel predictor,
   wherein said pre-generated predictors are at a bottom side or a right side of each of said one or more neighboring CUs on a smallest CU (SCU) basis, and wherein said pre-generated predictors are stored on a SCU basis.

2. The method of claim 1, wherein a number of said one or more boundary lines or columns in the boundary region of the current CU is pre-defined or adaptively determined based on CU size or PU size.

3. The method of claim 1, wherein when the current CU comprises a luma component and at least one chroma component, the current boundary pixel predictor for the current boundary pixel also comprises the luma component and said at least one chroma component.

4. The method of claim 1, wherein a local line buffer is used to store the pre-generated predictors corresponding to said one or more boundary lines or columns in the boundary region of the current CU.

5. The method of claim 4, wherein size of the local line buffer is pre-defined.

6. The method of claim 4, wherein size of the local line buffer is proportional to frame width.

7. The method of claim 1, wherein the first predictor for a current boundary pixel in the boundary region is generated after said performing motion-compensated prediction using the neighboring MV for each of said one or more neighboring CUs.

8. The method of claim 1, wherein said one or more corresponding pre-generated predictors are collocated with the current boundary pixel.

9. An apparatus of fine-grained motion compensated prediction for boundary pixels in a video coding system, the apparatus comprising one or more electronic circuits configured to:
   determine one or more neighboring coding units (CUs) associated with a current coding unit (CU), wherein each of said one or more neighboring CUs is associated with a neighboring motion vector (MV);
   perform motion-compensated prediction using the neighboring MV for each of said one or more neighboring CUs to derive pre-generated predictors, wherein the pre-generated predictors correspond to one or more boundary lines or columns in a boundary region of the current CU;
   store the pre-generated predictors;
   receive input data associated with the current CU having a current MV;
   generate a first predictor for a current boundary pixel in the boundary region by applying motion compensation based on the current MV, wherein pixels at boundaries of the current CU utilize the current MV and at least one MV from at least one of: an upper side MV and a left side MV to form a weighted sum of motion prediction when performing motion compensation;
   generate a current boundary pixel predictor for the current boundary pixel using a weighted sum of the first predictor and one or more corresponding pre-generated predictors according to weighting factors; and apply encoding or decoding to the current CU using prediction data including the current boundary pixel predictor, wherein said pre-generated predictors are at a bottom side or a right side of each of said one or more neighboring CUs on a smallest CU (SCU) basis, and wherein said pre-generated predictors are stored on a SCU basis.

10. The apparatus of claim 9, wherein a number of said one or more boundary lines or columns in the boundary region of the current CU is pre-defined or adaptively determined based on CU size or PU size.

11. The apparatus of claim 9, wherein when the current CU comprises a luma component and at least one chroma component, the current boundary pixel predictor for the current boundary pixel also comprises the luma component and said at least one chroma component.

12. The apparatus of claim 9 further comprising a local line buffer to store the pre-generated predictors corresponding to said one or more boundary lines or columns in the boundary region of the current CU.

13. The apparatus of claim 12, wherein size of the local line buffer is pre-defined.

14. The apparatus of claim 12, wherein size of the local line buffer is proportional to frame width.

15. The apparatus of claim 9, wherein the first predictor for a current boundary pixel in the boundary region is generated after the motion-compensated prediction is performed using the neighboring MV for each of said one or more neighboring CUs.

16. The apparatus of claim 9, wherein said one or more corresponding pre-generated predictors are collocated with the current boundary pixel.

17. The method of claim 1, wherein weighting factors for the weighted sum of motion prediction are adaptively determined based on a distance between a current boundary pixel and one of a left CU boundary and an upper CU boundary.

18. The apparatus of claim 9, wherein weighting factors for the weighted sum of motion prediction are adaptively determined based on a distance between a current boundary pixel and one of a left CU boundary and an upper CU boundary.

* * * * *